US00RE46670E

(19) United States
(12) Reissued Patent
Steiner et al.

(10) Patent Number: US RE46,670 E
(45) Date of Reissued Patent: Jan. 16, 2018

(54) FILTER

(71) Applicant: TM Industrial Supply, Inc., Erie, PA (US)

(72) Inventors: Carl A. Steiner, Erie, PA (US); Ricky L. Jackson, Union City, PA (US)

(73) Assignee: TM Industrial Supply, Inc., Erie, PA (US)

(21) Appl. No.: 15/239,980

(22) Filed: Aug. 18, 2016

Related U.S. Patent Documents

Reissue of:
(64) Patent No.: 9,192,884
Issued: Nov. 24, 2015
Appl. No.: 14/165,625
Filed: Jan. 28, 2014

U.S. Applications:
(62) Division of application No. 13/088,700, filed on Apr. 18, 2011, now Pat. No. 9,005,328.

(60) Provisional application No. 61/758,328, filed on Jan. 30, 2013, provisional application No. 61/329,762, filed on Apr. 30, 2010.

(51) Int. Cl.
*B01D 46/00* (2006.01)
*B01D 46/24* (2006.01)
*B01D 46/52* (2006.01)

(52) U.S. Cl.
CPC ..... *B01D 46/0058* (2013.01); *B01D 46/002* (2013.01); *B01D 46/0082* (2013.01); *B01D 46/2411* (2013.01); *B01D 46/521* (2013.01)

(58) Field of Classification Search
CPC ..... B01D 46/0021; B01D 46/002; B01D 46/0058; B01D 46/0082; B01D 46/2411; B01D 46/521
USPC ..... 55/484, 350.1, 414, 415, 342
See application file for complete search history.

(56) References Cited

U.S. PATENT DOCUMENTS

| | | | | |
|---|---|---|---|---|
| 2,523,793 | A * | 9/1950 | Vance | 210/193 |
| 4,169,059 | A * | 9/1979 | Storms | 210/493.1 |
| 4,559,066 | A * | 12/1985 | Hunter et al. | 96/117.5 |
| 4,865,627 | A | 9/1989 | Dewitz et al. | |
| 5,203,998 | A * | 4/1993 | Benian | 210/493.5 |
| 5,315,754 | A | 5/1994 | Klappert et al. | |
| 6,077,490 | A | 6/2000 | McIlroy et al. | |
| 6,197,195 | B1 * | 3/2001 | Booth | B01D 29/35 137/454.6 |
| 7,056,487 | B2 | 6/2006 | Newby | |
| 7,300,481 | B2 | 11/2007 | Scheuch | |
| 7,875,103 | B2 * | 1/2011 | Mueller | 95/196 |

(Continued)

*Primary Examiner* — Elizabeth McKane
(74) *Attorney, Agent, or Firm* — The Webb Law Firm

(57) ABSTRACT

A high temperature filter and a self-cleaning filtering system for filtering media, such as biomass materials, are provided. The filter and filtering system is particularly useful in the filtration of syngas in a plasma arc gasification process to remove char and other particles of down to a submicron size from the syngas. The filter is formed from a pleated metal mesh material including end caps secured by a high-temperature metallic paste or adhesive, such that the filter is capable of withstanding operating temperatures up to 2000° F. The system includes a backflush unit for injecting cleaning media therein to remove trapped char and other debris from the filter. At least two filtering systems can be placed in parallel so that one system can be cleaned while the other is operating. A method for filtering media is also disclosed.

28 Claims, 7 Drawing Sheets

(56) References Cited

U.S. PATENT DOCUMENTS

2005/0193889 A1 9/2005 Tran et al.
2014/0338293 A1* 11/2014 Williams et al. ..... 55/283

* cited by examiner

| Gas | Standard Operation | Off (No Flow) | Vent ( Opt) | Backflush |
|---|---|---|---|---|
| Inlet (56) | Open | Closed | Closed | Closed |
| Outlet (58) | Open | Closed | Closed | Closed |
| Drain (66) | Closed | Closed | Closed | Open |
| Vent (68) | Closed | Closed | Open | Closed |
| Purge (60) | Closed | Closed | Closed | Pulsed Open |

FIG. 4A

| Liquid | Standard Operation | Off (No Flow) | Vent ( Opt) | Backflush |
|---|---|---|---|---|
| Inlet (56) | Open | Closed | Closed | Closed |
| Outlet (58) | Open | Closed | Closed | Closed |
| Drain (66) | Closed | Closed | Closed | Open |
| Vent (68) | Closed | Closed | Open | Closed |
| Purge (60) | Closed | Closed | Closed | Pulsed Open |

FIG. 4B

| | | Vessel A | | | Vessel B | | |
|---|---|---|---|---|---|---|---|
| Liquid | Off (No Flow) | Start Up Operation | Hi DP Dwell | Backflush | Start Up Operation | Hi DP Dwell | Backflush |
| Valve 1A | Closed | Open | Closed | Closed | Closed | Open | Open |
| Valve 2A | Closed | Open | Closed | Closed | Closed | Open | Open |
| Valve 3A | Closed | Closed | Open | Open | Closed | Closed | Closed |
| Valve 4A | Closed | Closed | Closed | Open | Closed | Closed | Closed |
| Valve 1B | Closed | Closed | Open | Open | Open | Closed | Closed |
| Valve 2B | Closed | Closed | Open | Open | Open | Closed | Closed |
| Vavle 3B | Closed | Closed | Closed | Closed | Closed | Open | Open |
| Valve 4B | Closed | Closed | Closed | Closed | Closed | Closed | Open |

FIG. 5A

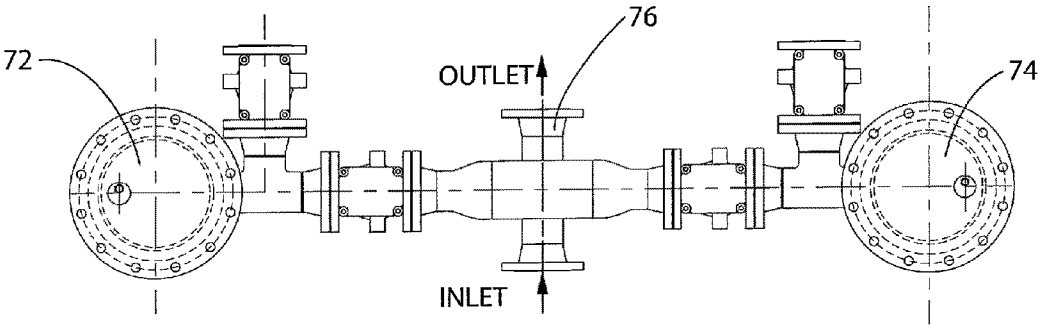

FIG. 6

MICRONIC FILTER CLOTH SPECIFICATIONS

Twilled Dutch Weave — Wire Cloth Catalog

| Nominal Filter Mesh Count | Wire Diameter Inches | Absolute Particle Retention | Nominal Particle Retention |
|---|---|---|---|
| warp/weft | warp/weft | Microns | Microns |
| 500 x 3500 | .0010 / .0006 | 5 | < 1 |
| 450 x 2750 | .0010 / .0008 | 6 - 7 | <1 |
| 325 x 2300 | .0015 / .0010 | 8 - 9 | 2 |
| 250 x 1400 | .0022 / .0016 | 11 - 12 | 4 |
| 200 x 1400 | .0028 / .0016 | 11 - 13 | 5 |
| 165 x 1400 | .0028 / .0016 | 16 - 18 | 10 |
| 165 x 1100 | | 20 - 21 | 12 |
| 165 x 800 | .0028 / .0020 | 24 - 26 | 15 |
| 200 x 600 | .0024 / .0018 | 28 - 32 | 20 |
| 80 x 700 | .0040 / .0030 | 34 - 36 | 25 |
| 120 x 600 | .0040 / .0025 | 40 - 45 | 30 |
| 120 x 400 | .0040 / .0026 | 50 - 55 | 40 |
| 40 x 560 | .0070 / .0040 | 71 - 80 | 50 |
| 30 x 360 | .0098 / .0060 | 95 - 106 | 80 |
| 30 x 250 | | 100 - 112 | 90 |
| 20 x 250 | .0098 / .0079 | 110 - 120 | 100 |

TWILL DUTCH WEAVE FILTER CLOTH

| Nominal Filter Mesh Count | Wire Diameter Inches | Absolute Particle Retention | Nominal Particle Retention | Nominal Particle Retention |
|---|---|---|---|---|
| warp/weft | warp/weft | Microns | Microns | Inches |
| 500 x 3500 | .0010 / .0006 | 5 | < 1 | 0.000035" |
| 450 x 2750 | .0010 / .0008 | 6 - 7 | <1 | |
| 325 x 2300 | .0015 / .0010 | 8 - 9 | 2 | 0.0000787" |
| 250 x 1400 | .0022 / .0016 | 11 - 12 | 4 | 0.0001574" |
| 200 x 1400 | .0028 / .0016 | 11 - 13 | 5 | 0.0001968" |
| 165 x 1400 | .0028 / .0016 | 16 - 18 | 10 | 0.0003937" |
| 165 x 1100 | | 20 - 21 | 12 | 0.0004724" |
| 165 x 800 | .0028 / .0020 | 24 - 26 | 15 | 0.0005905" |
| 200 x 600 | .0024 / .0018 | 28 - 32 | 20 | 0.0007874" |
| 80 x 700 | .0040 / .0030 | 34 - 36 | 25 | 0.0009842" |
| 120 x 600 | .0040 / .0025 | 40 - 45 | 30 | 0.0011811" |
| 120 x 400 | .0040 / .0026 | 50 - 55 | 40 | 0.0015748" |
| 40 x 560 | .0070 / .0040 | 71 - 80 | 50 | 0.0019685" |
| 30 x 360 | .0098 / .0060 | 95 - 106 | 80 | 0.0031496" |
| 30 x 250 | | 100 - 112 | 90 | 0.0035433" |
| 20 X 260 | | 110 - 120 | 100 | 0.0039370" |
| 20 x 250 | .0098 / .0079 | 110 - 120 | 100 | 0.0039370" |

FIG. 9

FILTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims priority to U.S. Provisional Patent Application No. 61/758,328, filed Jan. 30, 2013 and is a divisional of U.S. patent application Ser. No. 13/088,700, filed on Apr. 18, 2011 based upon U.S. Provisional Patent Application No. 61/329,762, filed Apr. 30, 2010.

BACKGROUND OF THE INVENTION

1. Field of the Invention

This invention relates to a filter and filtering system for filtering media and, more particularly, to a high temperature filter and a self-cleaning filtering system for filtering synthetic gas (syngas) in a gasification process.

2. Description of Related Art

In the synthetic gas (syngas) industry, it is known that any debris in a syngas system made from biomass will harm the catalyst used in the reaction process. Therefore, it is necessary to filter the syngas to remove this char and other particles typically found therein. Due to high temperature processing conditions, current gasification systems use filters formed from ceramic materials or tri-sintered metal. The use of these types of filters is often unsatisfactory, as ceramic filters can crack and sintered metal filters cannot be easily cleaned to remove the filtered particles therefrom. Additionally, ceramic material cannot be easily recycled. Therefore, the filters are often discarded after a particular period of time or after a particular number of filtering cycles. This discarding of the filters results in increased industrial waste and causes processing downtime during replacement.

Different methods and systems for filtering biomass or syngas materials are shown, for example, in U.S. Pat. Nos. 7,300,481; 7,056,487; 6,077,490 and 4,865,627.

There is a need in the art for a high temperature filter and self-cleaning filtering system that can sufficiently remove char and other particles from a media, such as biomass material, with a minimum amount of processing downtime that overcomes the disadvantages of the prior art.

SUMMARY OF THE INVENTION

According to one aspect, the present invention is directed to a filter for use in a gasification system such as in the production of synthetic gas or syngas. The filter can be formed from all stainless steel materials which can be easily cleaned and are readily recyclable into scrap material. The filter comprises a cylindrical member formed from a pleated metal mesh sheet having a first end portion and a second end portion. The pleated metal mesh sheet is overlapped and secured along at least one edge portion to hold the sheet in a cylindrical shape. At least one end cap is positioned adjacent to at least one of the first end portion and the second end portion. A high temperature metallic paste or adhesive secures at least one end cap to at least one of the first end portion and the second end portion. The pleated metal sheet is welded along the overlapped edge portion to form a weld line, and the metal paste can be applied along the weld line. According to one embodiment, the at least one end cap comprises a first end cap and a second end cap and the metallic paste or adhesive can also be used to secure the first end cap to the first end portion of the cylindrical member and to secure the second end cap to the second end portion of the cylindrical member. This metallic paste or adhesive can be capable of withstanding an operating temperature up to 2000° F. such as within the range of a 600-2000° F. or even the range of 1500-2000° F. One type of metallic paste that can be used is a high temperature epoxy resin. According to one embodiment, the metal mesh sheet is capable of filtering particles as small as 1 micron. According to another embodiment, the metal mesh sheet can be a metal cloth capable of filtering submicron sized particles.

According to another aspect, the present invention is directed to a self-cleaning filtering system for use in a gasification process comprising a housing, a filter located within the housing, an inlet in fluid communication with the housing and filter for feeding a supply of media therein for filtration, an outlet in fluid communication with and/or in cooperation with the filter for removing the filtered media, a backflush unit located inline between the filter and the outlet for injecting or backflushing cleaning material back into the filter and removing collected debris from the filter, and a drain in fluid communication with the housing for draining the debris as it is removed from the filter. The system can further include a vent for venting gas from within the housing. The cleaning material can be compressed air, steam, compressed gas, and liquid. One example of the cleaning material comprises the application of jet-air pulses. The supply of media can be a biomass material, which can be a liquid, such as water or oil, a gas, and/or a combination thereof. According to one embodiment, the media can comprise syngas and the filter can be configured for removing char and particles having a submicron size from the syngas. The filter can be a cylindrical pleated metal mesh filter. Also, the filter can be secured together with a high temperature metallic paste or adhesive and is capable of withstanding operating temperatures up to 2000° F. such as within the range of a 600-2000° F. or even the range of 1500-2000° F. The filtering system can be arranged in a simplex or a duplex design. In the duplex design, at least two filtering systems are placed in parallel so that at least one of the filtering systems remains in operation while the other system is being cleaned.

According to yet another aspect, the invention is directed to a method for filtering a syngas in a gasification system. The method comprises providing a housing, positioning a filter within the housing, feeding a supply of syngas into the housing and the filter for filtration thereof, and providing an outlet in fluid communication with and/or in cooperation with the filter for removing the filtered syngas material. The filter is capable of filtering submicron particles at high operating temperatures. The filter can comprise a metal mesh pleated cylindrical filter having a pair of end caps attached to the filter with a high temperature metallic paste or adhesive, such as an epoxy, e.g., Loctite®. The filter can be capable of withstanding operating temperatures up to 2000° F. such as within the range of a 600-2000° F. or even the range of 1500-2000° F. The method can further include providing a backflush unit located inline between the filter and the outlet for blowing cleaning media back through the filter to dislodge collected particles from the filter and providing a drain in fluid communication with the housing for draining the particles as they are removed from the filter.

The method can also include providing a vent in cooperation with the housing for venting excess gas from within the housing.

These and other features and characteristics of the present invention, as well as the methods of operation and functions of the related elements of structures, and the combination of parts and economies of manufacture, will become more apparent upon consideration of the following description with reference to the accompanying drawings, all of which form a part of this specification, wherein like reference numerals designate corresponding parts in the various figures.

BRIEF DESCRIPTION OF THE DRAWINGS

FIG. 4A shows a chart depicting the valving arrangement for the filtration of a gas through the filtering system of FIG. 4;

FIG. 4B shows a chart depicting the valving arrangement for the filtration of a liquid through the filtering system of FIG. 4;

FIG. 5A shows a chart depicting the valving arrangement for the filtration of a media through the filtering system of FIG. 5;

FIG. 6 shows a top view of the duplex filter system of FIG. 5;

FIG. 9 shows a chart depicting various specifications for Twill Dutch weave filter cloth which can be used for the metal mesh material of the filter of FIG. 1.

BRIEF DESCRIPTION OF THE INVENTION

Figure 1:
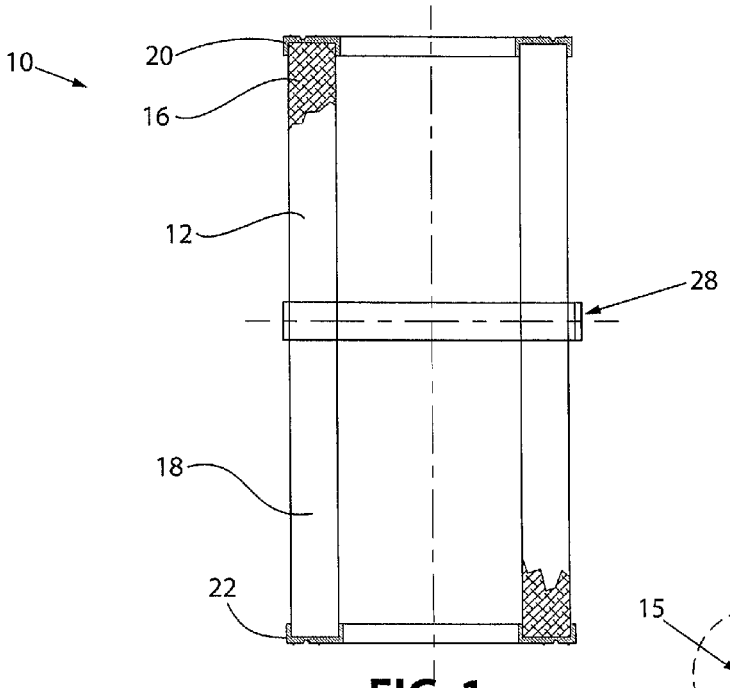
FIG. 1 shows a cross-sectional side elevation view of the filter, according to the invention, for use in the gasification process.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 3B:
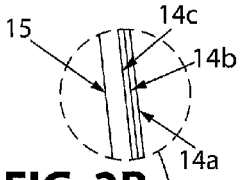
FIG. 3B shows an exploded view of the filter portion denoted by IIIB in FIG. 3A.
Figure 2:
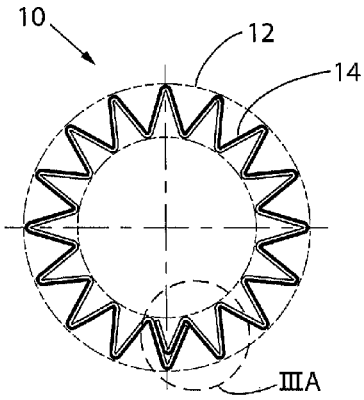
FIG. 2 shows a top view of the filter of FIG. 1.

Reference is now made to FIGS. 1-2, which show the filter according to the invention, generally indicated as 10, for use in a gasification process for filtering media, such as biomass materials or waste materials, such as a synthetic gas or syngas in a plasma arc gasification system. The filter 10 can be formed from all stainless steel materials. The use of an all stainless steel filter facilitates the physical cleaning of the filter so that the filter can be easily recycled as scrap metal. The filter 10 can comprise a cylindrical member 12 formed from a pleated metal mesh 14 sheet having a first end portion 16 and a second end portion 18. According to one embodiment, the filter 10 can be pleated into multiple pleats having multiple pleat depths so that a variety of filters having a variety of surface areas can be produced. In order to increase the amount of surface area, the filters are designed to be stackable upon one another. The pleated metal mesh sheet 14 is overlapped, as shown at 23 in FIG. 3A, and secured along at least one edge portion to hold the sheet 14 in a cylindrical shape. At least one end cap or a pair of end caps, such as a first end cap 20 and a second end cap 22, can be secured to the cylindrical member 12. A structural plate 28 can be provided substantially midway between the first end portion 16 and the second end portion 18 or at any other location as needed for supporting the cylindrical member 12. As illustrated in FIG. 3B, the filter 10 can comprise a plurality of metal mesh sheets 14a, 14b and 14c, and a perforated sheet metal layer 15 to provide support and strength to the metal mesh sheets 14a, 14b and 14c.

Figure 3A:
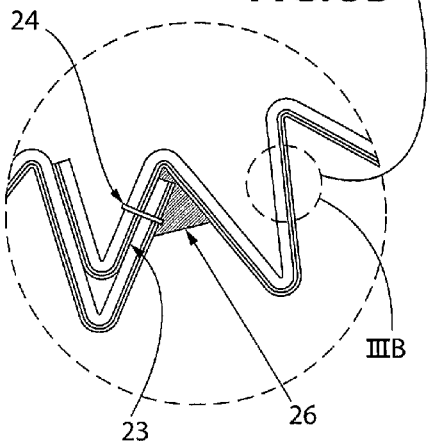
FIG. 3A shows an exploded view of the filter portion denoted by IIIA in FIG. 2.

A high temperature metallic paste can be used to secure the end caps 20, 22 to at least one of the first end portion 16 and the second end portion 18. The pleated metal sheet 14 can be welded along the overlapped one edge portion 23 to form a weld line 24 as shown in FIG. 3A and the high temperature metallic paste can also be applied, as shown by 26 in FIG. 3A, along the overlap having a length L such that the metallic paste encompasses the weld line 24. The purpose for the application of the metallic paste along entire length L of the overlap is to seal off this overlap and to fill any voids which may have been created during welding. The metallic paste is of a formulation that is capable of withstanding an operating temperature within the range of up to 2000° F. such as 600-2000° F. or even within the range of 1500-2000° F. The filter 10 is designed for filtering up to a 20 psid (differential). The metallic paste can be Loctite® Fixmaster® 2000° Putty, produced by the Henkel Corporation, which is an epoxy single component putty designed to fill and restore damaged metal and fill cracks in environments that will see temperatures up to 2000° F. This paste is water-based, non-toxic and a self-reactive cure type.

Figures 7, 8:
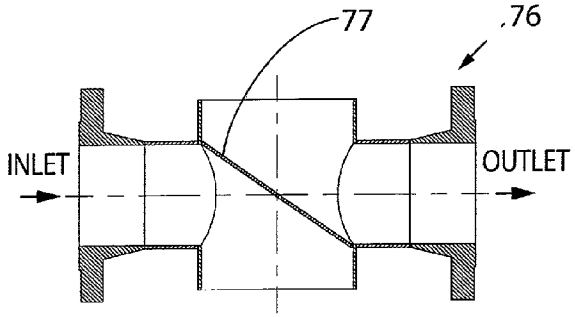
FIG. 7 shows a side elevation detailed view of the inlet/outlet manifold of the filtering system of FIG. 5.
FIG. 8 shows a chart depicting various micronic filter cloth specifications which can be used for the metal mesh material of the filter of FIG. 1.

According to one embodiment, the metal mesh sheet 14 is capable of filtering particles as small as 1 micron. According to another embodiment, the metal mesh sheet can be a metal cloth capable of filtering submicron sized particles. Examples of the different types of metal sheet and/or cloth material are shown in FIGS. 8 and 9. FIGS. 8 and 9 show Twill Dutch Weave Filter Cloth. The term "Twill" refers to a weave wherein the warp and weft (shute) wires pass alternately over two and under two wires. The term "Dutch" refers to the use of a heavier warp wire diameter in conjunction with a lighter weft wire diameter. In a Twill Dutch Filter Weave, the weft wires are driven up so tightly that there is always a shute wire above and below the warp wires, creating a weave with the warp wires completely covered. The flow-pass geometry is extremely tortuous, allowing reasonable flow rates while insuring excellent particle size retention.

Figure 4:
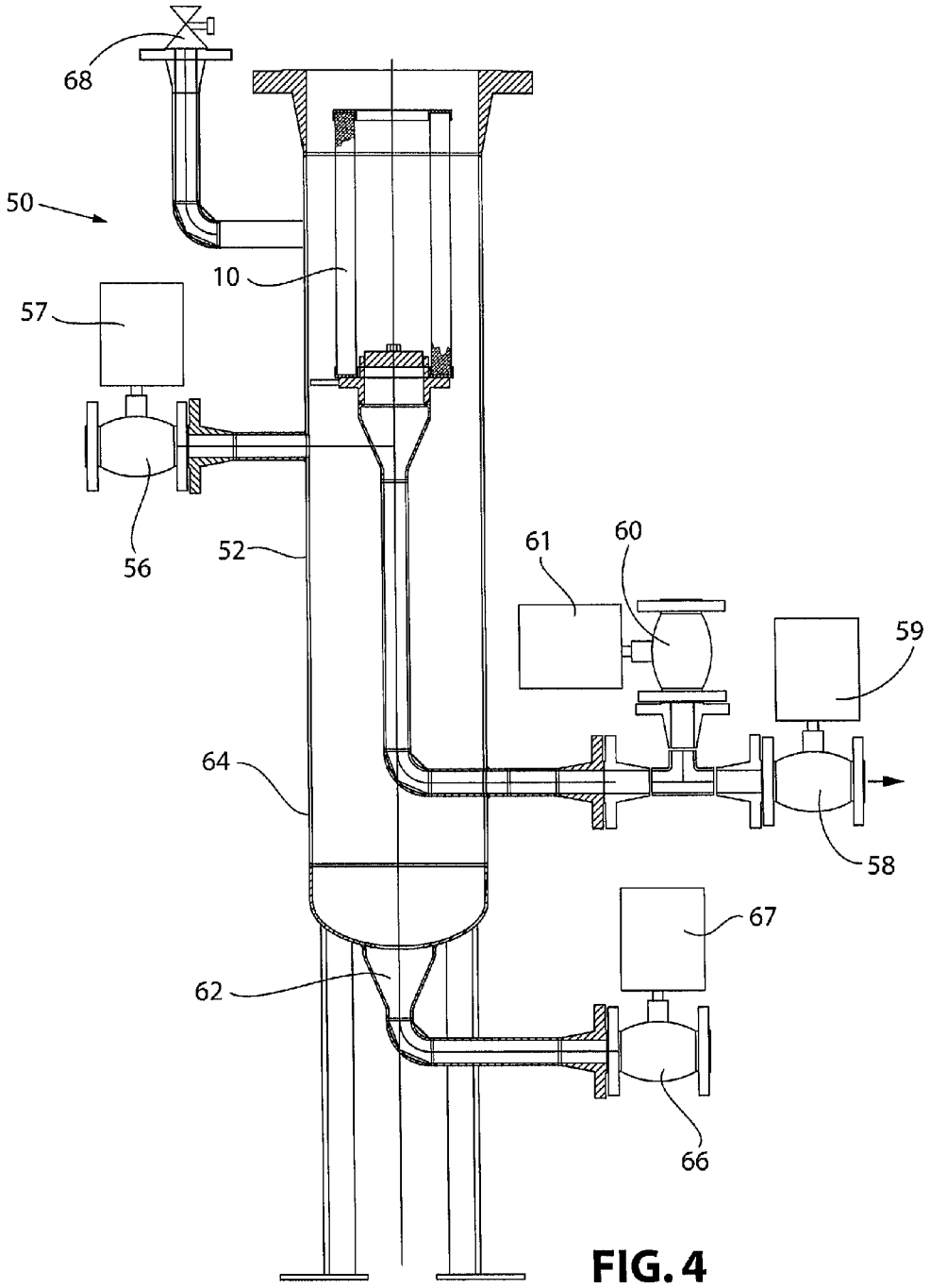
FIG. 4 shows a cross-sectional side elevation view of a simplex self-cleaning filtering system, including the filter of FIG. 1, for use in a gasification process.

Reference is now made to FIG. 4, which shows a cross-sectional side elevation view of a self-cleaning simplex self-cleaning filtering system, generally indicated as 50, including the filter 10 described above and shown in FIG. 1, for use in a gasification process. The filtering system 50 comprises a housing 52, the filter 10, located within the housing 52, and an inlet 56 for feeding a supply of media into the housing 52 and the filter 10 for filtration thereof. The system 50 further includes an outlet 58 in cooperation with the filter 10 for removing the filtered media and a backflush unit 60 located inline between the filter 10 and the outlet 58 for injecting or backflushing cleaning material back into the filter 10 and removing collected debris, such as char, from the filter 10. An opening 62 is located in fluid communication with the housing 52, such as at the bottom 64 of the housing 52, for draining the debris through drain 66 as it is removed from the filter 10. The system 50 can further include a vent 68 for venting gas from within the housing. The cleaning material can be compressed air, steam, compressed gas, liquid, and the like. One example of the cleaning material comprises a thirty second jet-air pulse to remove the char and debris that is collected on the filter element 10. The supply of media can be a biomass material and can be a liquid, such as water or oil, a gas, and/or a combination thereof. According to one embodiment, the media can comprise syngas and the filter 10 can be configured for removing char and particles having a 1 micron sized, or even as small as submicron sized, particles from the syngas. As discussed above, and shown in FIG. 1 the filter can be a cylindrical pleated metal mesh filter having the particular weaves shown in the tables of FIGS. 8 and 9. FIGS. 4A and 4B show the operation of the filtering system 50, including the opening and closing of the inlet 56, outlet 58, backflush unit 60 and drain 66, during the filtration of a gas and liquid respectively, during standard filtering operation, venting, and backflushing. It can be appreciated that inlet 56, outlet 58, backflush unit 60 and drain 66 can be located at any location with respect to the housing 52, as long as they are in fluid communication with the housing. Flow through the inlet 56, outlet 58, backflush unit 60 and drain 66 can be controlled, for example, by valves as shown by 57, 59, 61 and 67 in FIG. 4.

Figure 5:
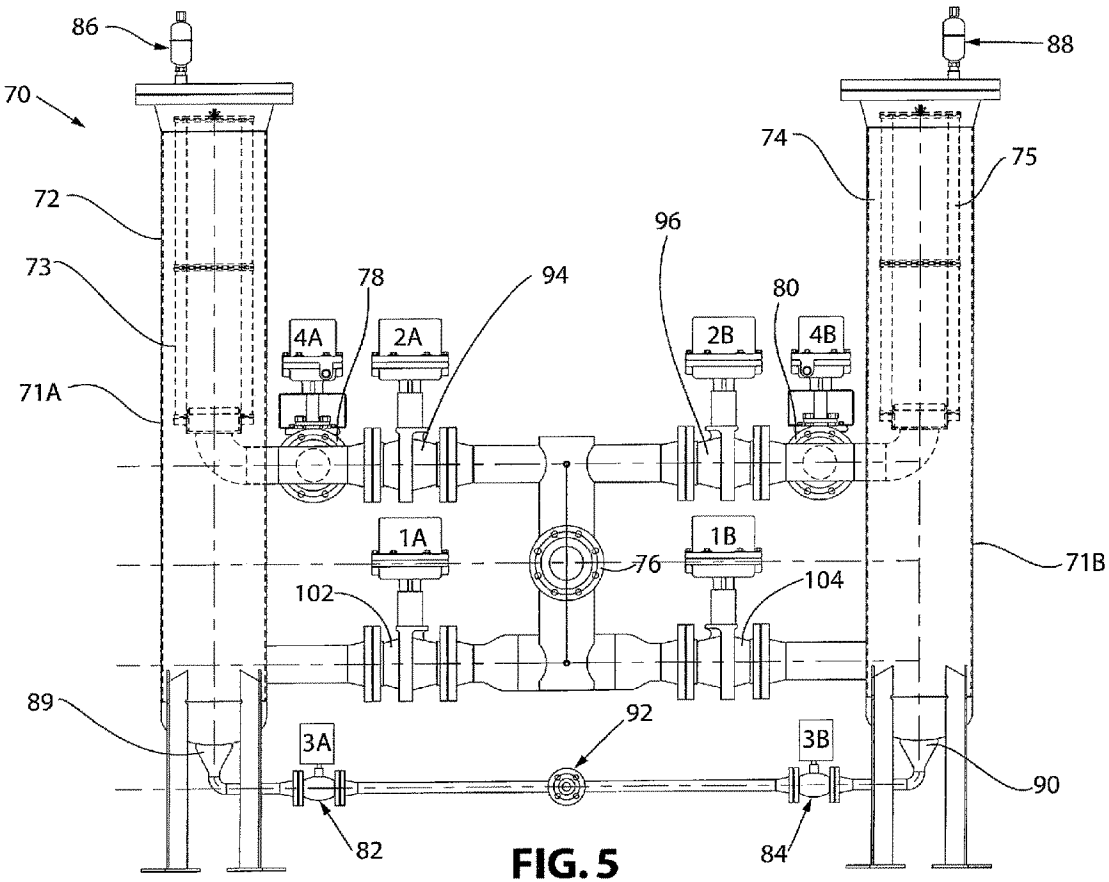
FIG. 5 shows a side elevation view of a duplex self-cleaning filtering system, including the filter of FIG. 1, for use in a gasification process.

As shown in FIGS. 5-7, the filtering system can be a duplex design, generally indicated as 70. In the duplex design, at least two filtering systems, such as a first filtering system 72 and a second filtering system 74, are placed in parallel so that at least one of the filtering systems 72, 74 remains in operation while the other system is being cleaned. The duplex system 70 also includes a pair of inlets 102, 104 for feeding the media into the respective first and second housings 71A, 71B and subsequently into first and second filters 73, 75, and a pair of outlets 94, 96 in fluid communication with first and second housings 71A, 71B respectively. An inlet/outlet manifold 76 is positioned in-line between the first and second filtering systems 72, 74. As illustrated in FIG. 7, the inlet/outlet manifold 76 includes a [baffle plate 77] *diverter element, such as a baffle plate 77,* to direct the inlet flow of the media to either the first filtering system 72 or second filtering system 74 depending upon which of the valves 1A or 1B are open. *The diverter element is capable of directing a fluid flow in a direction of the first filtering system and a direction of the second filtering system simultaneously.* The inlet flow then moves throughout the designated first or second filtering system 72, 74. After filtration is completed, the filtered media then re-enters the inlet/outlet manifold 76 and comes into contact with baffle plate 77 which prevents the filtered media from re-entering into the first or second filtering systems 72, 74 and diverts the filtered media through the outlet and out of the duplex system 70.

During cleaning of one of the filtering systems 72, 74, certain valves associated with that particular system to be cleaned start closing (e.g. 1A, 2A, 1B, 2B) while other valves, directly associated with a respective filter 73, 75 (e.g. 4A and 4B), are opened and closed on an intermittent schedule and the respective valve associated with drain 92 (e.g. 3A and 3B), is opened, while introducing a back purge via first and second backflush units 78 or 80 to dislodge the debris from the filter media so that this debris is discharged out the first and/or second bottom drain 82, 84, respectively. First and second vents 86, 88 may be provided to vent any excess gas from the filtering systems 72, 74. FIG. 5A shows the operation of the duplex filtering system 70, including the opening and closing of the various valves 1A-4A and 1B-4B during the filtration of a media, during no-flow, start-up operation, dwell and backflush. It can be appreciated that the media can be any type of material to be filtered, including water, oil, gas, and the like.

As stated above, this duplex arrangement 70, as shown in FIGS. 5-7, ensures that the system functions in a continuous manner. The duplex housing arrangement 70 will switch from one housing 72 to the other 74, upon a 15 psid differential, then a cleaning process will be activated, for example, a cleaning process using a 30 second Jet-Air Pulse, via a backflush unit 78, 80 to remove the debris on the filter element 10, which is then blown down through the cone bottom 89, 90 of the housing, through drains 82, 84 and subsequently out of the system via drain 92, thus discharging the filtered char from the surface of the filter 10.

According to another aspect, the invention is directed to a method for filtering a media, such as a syngas, in a gasification system. With continuing reference to FIG. 4, the method comprises providing a housing 52, positioning a filter 10 within the housing 52, feeding a supply of media into the housing 52 and the filter 10 for filtration thereof, and providing an outlet 58 for cooperation with the filter 10 for removing the filtered material. The filter 10 is capable of filtering sub-micron particles at high operating temperatures up to 2000° F., such as within the range of 600-2000° F. or even the range of 1500-2000° F. As shown in FIGS. 1-2, 3A, 3B and 4, and discussed above, the filter 10 can comprise a metal mesh pleated cylindrical filter member 12, including a pair of end caps 20, 22 attached to the filter 10 with a high temperature metallic paste or adhesive. The method can further include providing a backflush unit 60 located inline between the filter 10 and the outlet 58 for introducing cleaning media back through the filter 10 to dislodge collected particles and char from the filter 10. The method also includes providing an outlet or drain 62 in the housing and a drain outlet 66 for draining the particles out of the housing 52 as they are removed from the filter 10. The method can also include providing a vent 68 cooperating with the housing for venting excess gas from within the housing. The above-described method can also be performed using the duplex system, as shown in FIGS. 5-7, so that the system functions in a continuous manner during cleaning, thus eliminating downtime during the processing of the media.

It can be appreciated that the syngas filtration process system of the invention can be used on any type of media or biomass syngas, including municipal solid waste (MSW), waste food, glycerin, wood chips, crop waste, coal gasification (IGCC), and the like.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this description. For example, it is to be understood that the present invention contemplates that, to the extent possible, one or more features of any embodiment can be combined with one or more features of any other embodiment.

The invention claimed is:

1. A duplex filtering system for filtering a fluid comprising:

a manifold housing having a manifold inlet port and a manifold outlet port, wherein the manifold inlet port and manifold outlet port are integral with the manifold housing;

a first filtering system having a first filtering system inlet port and a first filtering system outlet port in fluid communication with the manifold housing;

a second filtering system having a second filtering system inlet port and a second filtering system outlet port in fluid communication with the manifold housing;

a diverter element disposed within the manifold housing between the manifold inlet port and manifold outlet port *and capable of directing a fluid flow in a direction of the first filtering system and a direction of the second filtering system simultaneously*; and one or more valves for selectively establishing or restricting fluid flow through one or more ports of the manifold housing, thereby selectively causing fluid flow either only through the first filtering system, only through the second filtering system, or through both the first filtering system and the second filtering system, wherein the manifold housing is positioned in-line between the first and second filtering systems.

2. The duplex filtering system of claim 1, wherein the [manifold housing includes] *diverter element includes* a baffle plate *configured* to direct an inlet flow of media to either the first filtering system or the second filtering system depending upon opening and/or closing of the one or more valves.

3. The duplex filtering system of claim 1, wherein the one or more valves are configured to selectively open and/or close during cleaning of one of the first or second filtering systems.

4. The duplex filtering system of claim 3, wherein the system is configured to function in a continuous manner.

5. The duplex filtering system of claim 4, wherein the first filtering system includes a first cone bottom and a first bottom drain and the second filtering system includes a second cone bottom and a second bottom drain wherein debris created during cleaning of the first or second filtering system exits through the respective first or second cone bottom and first or second bottom drain and wherein the duplex system further includes a drain associated with the first bottom drain and the second bottom drain for discharging the debris from the system.

6. A duplex filtering system for filtering a fluid comprising:

a manifold housing having a manifold inlet port and a manifold outlet port, wherein the manifold inlet port and manifold outlet port are integral with the manifold housing;

a first filtering system having a first filtering system inlet port, a first filter, and a first filtering system outlet port in fluid communication with the manifold housing;

a second filtering system having a second filtering system inlet port, a second filter, and a second filtering system outlet port in fluid communication with the manifold housing;

a diverter element disposed within the manifold housing between the manifold inlet port and manifold outlet port; and one or more valves for selectively establishing or restricting fluid flow through one or more ports of the manifold housing, thereby selectively causing fluid flow either only through the first filtering system, only through the second filtering system, or through both the first filtering system and the second filtering system, wherein the manifold housing is positioned in-line between the first and second filtering systems; and wherein at least one of the first filter and the second filter comprises a cylindrical member formed from a [pleated] metal mesh sheet having a first end portion and a second end portion, said [pleated] metal mesh sheet being overlapped and secured along at least one edge portion to hold the sheet in a cylindrical shape, at least one end cap positioned adjacent to at least one of the first end portion and the second end portion; and a high temperature metallic paste or adhesive for securing the at least one end cap to the at least one of the first end portion and the second end portion.

7. The duplex filtering system of claim 6, wherein the [pleated] metal *mesh* sheet is welded along the at least one edge portion to form a weld line.

8. The duplex filtering system of claim 7, wherein the metallic paste or adhesive is applied along the weld line.

9. The duplex filtering system of claim 6, wherein the at least one end cap comprises a first end cap and a second end cap and wherein the metallic paste or adhesive is used to secure the first end cap to the first end portion of the cylindrical member and the second end cap to the second end portion of the cylindrical member.

10. The duplex filtering system of claim 6, wherein the metallic paste or adhesive is capable of withstanding an operating temperature within the range of 600-2000° F.

11. The duplex filtering system of claim 6, wherein the metal mesh sheet is capable of filtering particles as small as 1 micron.

12. The duplex filtering system of claim 6, wherein the metal mesh sheet is a metal cloth capable of filtering submicron sized particles.

13. The duplex filtering system of claim 6, wherein the at least one edge portion is secured directly to and solely to the metal mesh sheet to hold the sheet in the cylindrical shape.

14. The duplex filtering system of claim 6, wherein the [manifold housing includes] *diverter element includes* a baffle plate *configured* to direct an inlet flow of media to either the first filtering system or the second filtering system depending upon opening and/or closing of the one or more valves.

15. The duplex filtering system of claim 6, wherein the one or more valves are configured to selectively open and/or close during cleaning of one of the first or second filtering systems.

16. The duplex filtering system of claim 15, wherein the system is configured to function in a continuous manner.

17. The duplex filtering system of claim 16, wherein the first filtering system includes a first cone bottom and a first bottom drain and the second filtering system includes a second cone bottom and a second bottom drain wherein debris created during cleaning of the first or second filtering system exits through the respective first or second cone bottom and first or second bottom drain and wherein the duplex system further includes a drain associated with the first bottom drain and the second bottom drain for discharging the debris from the system.

18. A duplex filtering system for continuously filtering a fluid, said system comprising:

a manifold housing having a manifold inlet port and a manifold outlet port, wherein the manifold inlet port and manifold outlet port are integral with the manifold housing;

a first filtering system having a first filtering system inlet port and a first filtering system outlet port in fluid communication with the manifold housing;

a second filtering system having a second filtering system inlet port and a second filtering system outlet port in fluid communication with the manifold housing;

a diverter element disposed within the manifold housing between the manifold inlet port and manifold outlet port; *and* one or more valves for selectively establishing or restricting fluid flow through one or more ports of the manifold housing, thereby selectively causing fluid flow either only through the first filtering system, only through the second filtering system, or through both the first filtering system and the second filtering [system; and] *system,*

*wherein the diverter element includes* a baffle plate [located within the manifold housing] *configured* to direct an inlet flow of media to either the first filtering system or the second filtering system depending upon opening and/or closing of the one or more valves, wherein the one or more valves are configured to selectively open and/or close during cleaning of one of the first or second filtering systems while the opposite first or second filtering system continues to filter the fluid, and wherein the manifold housing is positioned in-line between the first and second filtering systems.

19. The duplex filtering system of claim 1, wherein the diverter element prevents filtered media exiting the first and/or second filtering system from re-entering into the first and/or second filtering system and diverts the filtered media through the manifold outlet port and out of the duplex filtering system.

20. The duplex filtering system of claim 6, wherein the diverter element prevents filtered media exiting the first and/or second filtering system from re-entering into the first and/or second filtering system and diverts the filtered media through the manifold outlet port and out of the duplex filtering system.

21. The duplex filtering system of claim 18, wherein the diverter element prevents filtered media exiting the first and/or second filtering system from re-entering into the first and/or second filtering system and diverts the filtered media through the manifold outlet port and out of the duplex filtering system.

22. The duplex filtering system of claim 1, wherein the one or more valves are associated with the manifold assembly and comprises at least four valves.

23. The duplex filtering system of claim 6, wherein the one or more valves are associated with the manifold assembly and comprises at least four valves.

24. The duplex filtering system of claim 18, wherein the one or more valves are associated with the manifold assembly and comprises at least four valves.

*25. A duplex filtering system for filtering a fluid comprising:*

*a manifold housing having a manifold inlet port and a manifold outlet port, wherein the manifold inlet port and manifold outlet port are integral with the manifold housing;*

*a first filtering system having a first filtering system inlet port and a first filtering system outlet port in fluid communication with the manifold housing;*

*a second filtering system having a second filtering system inlet port and a second filtering system outlet port in fluid communication with the manifold housing; and*

*a diverter element disposed within the manifold housing between the manifold inlet port and manifold outlet port and capable of directing a fluid flow in a direction of the first filtering system and a direction of the second filtering system simultaneously,*

*wherein the manifold housing is positioned in-line between the first and second filtering systems.*

*26. A duplex filtering system for filtering a fluid comprising:*

*a manifold housing having a manifold inlet port and a manifold outlet port, wherein the manifold inlet port and manifold outlet port are integral with the manifold housing;*

*a first filtering system having a first filtering system inlet port, a first filter, and a first filtering system outlet port in fluid communication with the manifold housing;*

*a second filtering system having a second filtering system inlet port, a second filter, and a second filtering system outlet port in fluid communication with the manifold housing; and*

*a diverter element disposed within the manifold housing between the manifold inlet port and manifold outlet port,*

*wherein the manifold housing is positioned in-line between the first and second filtering systems, and*

*wherein at least one of the first filter and the second filter comprises a cylindrical member formed from a metal mesh sheet having a first end portion and a second end portion, said metal mesh sheet being overlapped and secured along at least one edge portion to hold the sheet in a cylindrical shape, at least one end cap positioned adjacent to at least one of the first end portion and the second end portion; and a high temperature metallic paste or adhesive for securing the at least one end cap to the at least one of the first end portion and the second end portion.*

*27. A duplex filtering system of claim 6, wherein the metal mesh sheet is pleated.*

*28. A duplex filtering system of claim 26, wherein the metal mesh sheet is pleated.*

* * * * *